Aug. 31, 1954 J. KEISER 2,687,568
CONNECTING ROD TOOL
Filed April 19, 1951
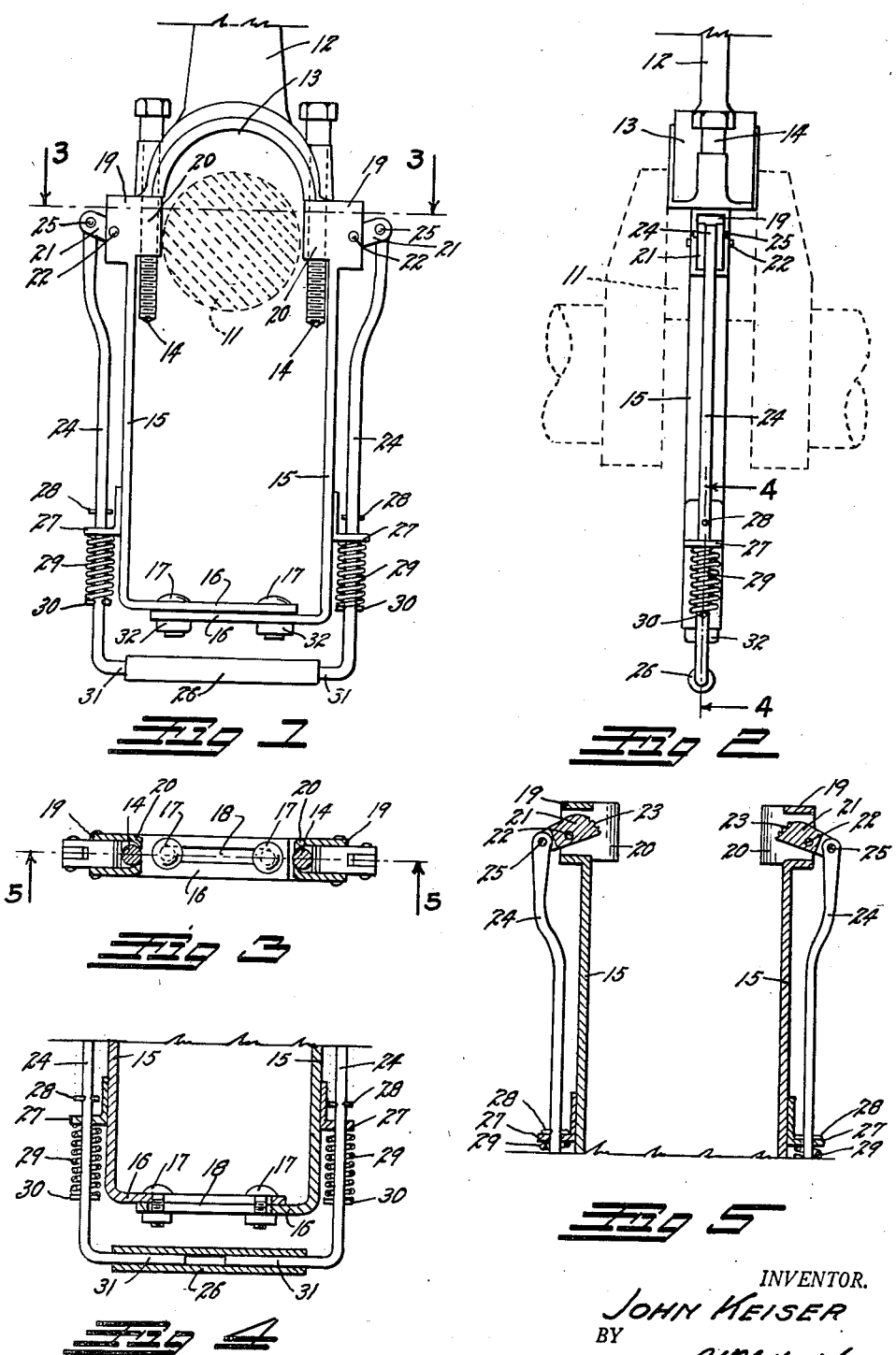
INVENTOR.
JOHN KEISER
BY
ATTORNEY Patented Aug. 31, 1954

2,687,568

UNITED STATES PATENT OFFICE 2,687,568

CONNECTING ROD TOOL

John Keiser, Windsor, Colo.

Application April 19, 1951, Serial No. 221,853

1 Claim. (Cl. 29—278)

This invention relates to a connecting rod installing tool for internal combustion engines. In the modern, multi-cylinder engines crank case space is so limited that it is exceedingly difficult to reach the lower extremities of the connecting rods in order to properly position them on their respective cranks on the crank shaft, and it is difficult to obtain sufficient grip upon the rods to pull the pistons downwardly in the cylinders against the friction of the highly expansive piston rings.

The principal object of this invention is to provide a highly efficient tool by means of which a connecting rod can be quickly and easily engaged with sufficient grip to draw a piston downward in a cylinder under any normal conditions, and which will require only a single hand in its operation so that the mechanic's other hand will be free for placing the bearing cap in place.

Another object of the invention is to so construct the tool that it can operate in the exceedingly close tolerances found in modern engines between the bearing cap bolts and the cranks on the crank shaft, and which can be used to rotate the pistons in the cylinders to easily align the connecting rod bearing with the crank shaft cranks.

A further object is to construct a connecting rod tool of the bearing bolt engaging type which can be quickly and easily adjusted to any of the normal bearing bolt spacings found on modern engines without interfering with the operation of the tool.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved tool, illustrating it in place on a connecting rod;

Fig. 2 is an edge view of the tool and connecting rod;

Fig. 3 is a horizontal section looking downward on the line 3—3, Fig. 1;

Fig. 4 is a fragmentary, vertical section, taken on the line 4—4, Fig. 2; and

Fig. 5 is a similar section, taken on the line 5—5, Fig. 3.

In Figs. 1 and 2 the position of a conventional crank shaft and its crank 11 have been indicated in broken line, and a connecting rod 12, with its crank bearing socket 13 and bearing cap bolts 14, has been illustrated in full line.

The improved connecting rod tool has a U-shaped frame consisting of two L-shaped side arms 15, the lower extremities of which are turned inwardly toward each other, as shown at 16, and secured together by means of clamp bolts 17 and nuts 32. The bolts 17 pass through elongated openings 18 in the extremities 16 which allow the arms 15 to be adjusted toward or away from each other to obtain the desired width or spacing, after which they are securely clamped together in a U-shape by means of the bolts 17.

A ratchet box 19 is formed on the upper extremity of each arm 15, each box extending outwardly from its respective arm. The two sides of each box extend inwardly toward the opposite box to form a pair of bolt-gripping ears 20. The gripping ears of each pair are bent inwardly toward each other to form hooked vertical edges which will partially surround a bolt placed between the pair of ears 20.

A ratchet lever 21 is mounted in each box 19 upon a pivot pin 22. Each ratchet lever 21 has an eccentric, toothed extremity 23. The outer extremity of each lever 21 is bifurcated to receive the upper extremity of a vertical ratched-operating rod 24 which is hingedly secured between the furcations upon a suitable hinge pin 25.

The operating rods 24 are L-shaped and have angularly-turned, horizontal, lower extremities 31 which extend toward each other within a slidable sleeve 26. The rods 24 are held in generally parallel relation with the arms 15 by means of angle bracket members 27 secured to the arms 15 and through which the rods 24 slide. The downward movement of the rods 24 is limited by means of stop pins or abutments 28 which come to rest against the tops of the angle brackets 27. Spacing adjustment of the arms 15 is accommodated by the sliding arrangement of the extremities 31 in the sleeve 26.

Each rod is constantly urged downward by means of a compression spring 29 which acts against a spring stop or stop pin 30 mounted through, or otherwise secured on, the rod. When the rods are at the lowest limit of their travel, as limited by the stop pins 28, the toothed extremities 23 of the ratchet levers 21 will be swung into the bolt channels between the pairs of ears 20, as shown in Fig. 5.

Let us assume that the spacing of the two arms 15 has been pre-set for the spacing of the bearing cap bolts 14 in the connecting rod 12. The mechanic holds the tool by gripping the arm extremities 16 and the sleeve 26 in one hand. By tightening his grip he forces the sleeve 26 toward the extremities 16, thereby compressing the springs 29 and causing the rods 24 to swing the inner toothed extremities 23 of the ratchet levers 21 downwardly away from each other and outwardly from the bolt channels between the pairs of ears 20.

He then passes the two arms 15 on opposite sides of the crank 11 and moves the tool toward the lower extremity of the connecting rod 12, causing the two bearing cap bolts 14 to pass into the bolt channels between the opposite pairs of ears 20 until the connecting rod rests on the upper extremity of the tool. The hand grip is now released, allowing the springs to swing the toothed extremities of the ratchet levers into gripping engagement with the bolts 14. The connecting rod is now rotated, if necessary, to bring it into alignment with the crank 11, and the bearing socket 13 is pulled down snugly against the crank. The grip of the hand is now increased to disengage the ratchet levers, and the tool is withdrawn.

In connecting rods of the types having fixed bolts or studs the tool can be forced upwardly on the bolts or studs without manual release of the ratchet levers, since the latter will swing down automatically as the tool is forced upward on the studs.

In present multi-cylinder engines there is very little space between the bolts 14 and the sides of the crank 11. Therefore, tools which completely surround the bolts cannot be used. In this device the ears 20 do not project inwardly beyond the circumference of the crank, and scratching or interference with the crank, and scratching or damaging the crank bearing surface, is avoided.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A tool for assembling connecting rods and crank shaft bearings in an engine in which the divided bearing ends of the rods are interconnected by bolts that have threaded ends normally disposed at opposite sides of the shaft bearing, said tool comprising: a U-shaped frame having hollow ears at the ends of its legs, said ears opening outwardly in a horizontal direction, and forming vertical channels inwardly of the legs and of a size to pass over the threaded bolt ends, the inner sides of the channel portions being relieved so that there is no ear material projecting inwardly beyond the bolts when the tool is applied; shiftable devices extending into the horizontal ear openings, said devices mounted and shaped so that they can firmly engage the outward sides of the threaded bolt ends; actuating means connected to said devices and extending into proximity to the base of said U-shaped frame, said actuating means comprising a pair of rods having their free ends bent toward each other below said base; a sleeve interconnecting said free ends; and spring means reacting between said rods and said frame to normally project said devices into said vertical channels.

References Cited in the file of this patent

UNITED STATES PATENTS

| Number | Name | Date |
|---|---|---|
| 489,782 | Bahret | Jan. 10, 1893 |
| 749,318 | Morris | Jan. 12, 1904 |
| 983,038 | Ferris | Jan. 31, 1911 |
| 1,131,290 | Studebaker | Mar. 9, 1915 |
| 1,264,579 | Swingle | Apr. 30, 1918 |
| 1,451,606 | Arneson | Apr. 10, 1923 |
| 1,529,518 | Voeller | Mar. 10, 1925 |
| 2,157,753 | Gantt | May 9, 1939 |
| 2,508,047 | Starnes | May 16, 1950 |

FOREIGN PATENTS

| Number | Country | Date |
|---|---|---|
| 254,395 | Germany | Nov. 30, 1912 |